United States Patent
Zielinski

(10) Patent No.: US 7,793,203 B2
(45) Date of Patent: Sep. 7, 2010

(54) FIELDBUS PROCESS COMMUNICATIONS USING ERROR CORRECTION

(75) Inventor: Stephen A. Zielinski, Savage, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 1153 days.

(21) Appl. No.: 11/433,633

(22) Filed: May 12, 2006

(65) Prior Publication Data

US 2006/0259159 A1 Nov. 16, 2006

Related U.S. Application Data

(60) Provisional application No. 60/680,643, filed on May 13, 2005.

(51) Int. Cl.
*G06F 11/00* (2006.01)

(52) U.S. Cl. .................................. 714/801; 714/767

(58) Field of Classification Search ................. 710/305; 439/76.1; 700/19; 370/466; 717/171; 714/758, 714/774, 755, 801, 767; 323/273
See application file for complete search history.

(56) References Cited

U.S. PATENT DOCUMENTS

| 5,938,754 | A | * | 8/1999 | Edwards et al. | 710/305 |
|---|---|---|---|---|---|
| 6,298,454 | B1 | | 10/2001 | Schleiss et al. | 714/37 |
| 6,686,831 | B2 | * | 2/2004 | Cook et al. | 323/273 |
| 7,035,693 | B2 | * | 4/2006 | Cassiolato et al. | 700/1 |
| 7,072,779 | B2 | * | 7/2006 | Hancock et al. | 702/60 |
| 7,203,885 | B2 | * | 4/2007 | Gibart | 714/755 |
| 7,424,327 | B2 | * | 9/2008 | Grgic et al. | 700/9 |
| 7,462,041 | B2 | * | 12/2008 | Bormann et al. | 439/76.1 |
| 2004/0010651 | A1 | * | 1/2004 | Wiegert | 710/305 |
| 2004/0064777 | A1 | | 4/2004 | Kurtas et al. | 714/752 |
| 2006/0111794 | A1 | * | 5/2006 | Wysuph et al. | 700/19 |
| 2006/0140209 | A1 | * | 6/2006 | Cassiolato et al. | 370/466 |
| 2007/0124111 | A1 | * | 5/2007 | Rogoll et al. | 702/182 |
| 2007/0234339 | A1 | * | 10/2007 | Kostadinov | 717/171 |
| 2008/0177552 | A1 | * | 7/2008 | Poimboeuf et al. | 704/500 |

FOREIGN PATENT DOCUMENTS

| EP | 1 427 126 A | 6/2004 |
|---|---|---|
| EP | 1 494 358 A | 1/2005 |

(Continued)

OTHER PUBLICATIONS

M. Fu, "Dynamic Modeling and Analysis of Iterative Decoding Processes," Keynote speech at 5$^{th}$ Int. Conf. Control & Automation, Jun. 2005.

(Continued)

*Primary Examiner*—David Ton
(74) *Attorney, Agent, or Firm*—Christopher R. Christenson; Westman, Champlin & Kelly, P.A.

(57) ABSTRACT

A method of communicating over an H1 Fieldbus network is provided. The communication over the H1 Fieldbus network employs an advanced form of error correction. In one embodiment, the advanced form of error correction utilizes low-density parity check codes; while in another embodiment, the advanced error correction employs turbo codes. The use of the advanced error correction with the H1 foundation Fieldbus network allows for higher data transmission speeds than 31.25 kbps and/or lower signaling levels than used currently.

11 Claims, 3 Drawing Sheets

FOREIGN PATENT DOCUMENTS

WO        WO 01/15391 A        3/2001

OTHER PUBLICATIONS

W. E. Ryan, "An Introduction to LDPC Codes," in CRC Handbook for Coding and Signal Processing for Recording Systems (B. Vasic, ed.) CRC Press, 2004.

First Communication from European Patent Application 06 77 0297.7, filed May 12, 2006.

W. Lenz, "Developments in High Performance Proportional Valves with Canopen Fieldbus Interface," The Sixth Scandinavian International Conference on Fluid Power, May 26, 1999w.

Blevins et al., "Fieldbus Support for Process Analysis," ISA Transactions, vol. 35, No. 2, 1996, pp. 177-183.

European Search Report from Application PCT/US2006/018515 filed May 12, 2006.

* cited by examiner

FIELDBUS PROCESS COMMUNICATIONS USING ERROR CORRECTION

CROSS-REFERENCE TO RELATED APPLICATION

The present application is based on and claims the benefit of U.S. provisional patent application Ser. No. 60/680,643, filed May 13, 2005, the content of which is hereby incorporated by reference in its entirety.

BACKGROUND OF THE INVENTION

Process control systems, like those used in chemical, petroleum or other processes, typically include a centralized process controller communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses to the field devices to control the operation of the process. Information from the field devices and the controllers is typically made available to one or more applications executed by the operator workstation to enable an operator to perform any desired function with respect to the process, such as viewing the current state of the process, modifying the operation of the process, et cetera.

In the past, conventional field devices were used to send and receive analog (e.g., 4 to 20 mA) signals to and from the process controller via an analog bus or analog lines. These 4-20 mA signals were limited in nature in that they were indicative of measurements made by the device or control signals generated by the controller required to control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self-calibration, identification, diagnostics, et cetera. A number of standard and open smart communication protocols such as the HART®, Profibus®, World FIP®, Device-Net®, and CAN protocols, have been developed to enable smart field devices made by different manufacturers to be used together within the same process control network.

There has been a move within the process control industry to decentralize process control functions. For example, the all-digital, two-wire bus protocol promulgated by the Fieldbus foundation known as the FOUNDATION™ Fieldbus (hereinafter "Fieldbus") protocol uses function blocks located in different field devices to perform control operations previously performed within a centralized controller. In particular, each Fieldbus field device is capable of including and executing one or more function blocks, each of which receives inputs from and/or provides outputs to other function blocks (either within the same device or within different devices), and performs some process control operation, such as measuring or detecting a process parameter, controlling a device or performing a control operation, such as implementing a proportional-derivative-integral (PID) control routine. The different function blocks within a process control system are configured to communicate with each other (e.g., over a bus) to form one or more process control loops, the individual operations of which are spread throughout the process and are, thus, decentralized.

With the advent of smart field devices, it is more important than ever to be able to quickly diagnose and correct problems that occur within a process control system, as the failure to detect and correct poorly performing loops and devices leads to sub-optimal performance of the process, which can be costly in terms of the both the quality and the quantity of product being produced. Many smart devices currently include self-diagnostic and/or calibration routines that can be used to detect and correct problems within the field device. Unfortunately, the wealth of new diagnostics and/or calibration abilities of smart field devices can, in some instances, generate problems. For example, a given H1 Fieldbus loop can couple to a number of FOUNDATION™ Fieldbus-compatible field devices. Each such field device may be generating a wealth of digital information, including process variable information, or receiving control information from a controller. Moreover, each field device may also be generating diagnostic information as well as any other suitable digital information. The result is that the maximum bandwidth of the H1 Fieldbus network (31.25 kbps) may become overwhelmed by the data communication needs of multiple smart field devices on a given H1 Fieldbus network.

Providing an adaptation to the H1 FOUNDATION™ Fieldbus network that allows higher communication rates over the network, thereby increasing the useable bandwidth of the H1 Fieldbus network, would be highly beneficial.

SUMMARY

A method of communicating over an H1 Fieldbus network is provided. The communication over the H1 Fieldbus network employs an advanced form of error correction. In one embodiment, the advanced form of error correction utilizes low-density parity check codes; while in another embodiment, the advanced error correction employs turbo codes. The use of the advanced error correction with the H1 foundation Fieldbus network allows for higher data transmission speeds than 31.25 kbps and/or lower signaling levels than used currently.

DETAILED DESCRIPTION

Figure 1:
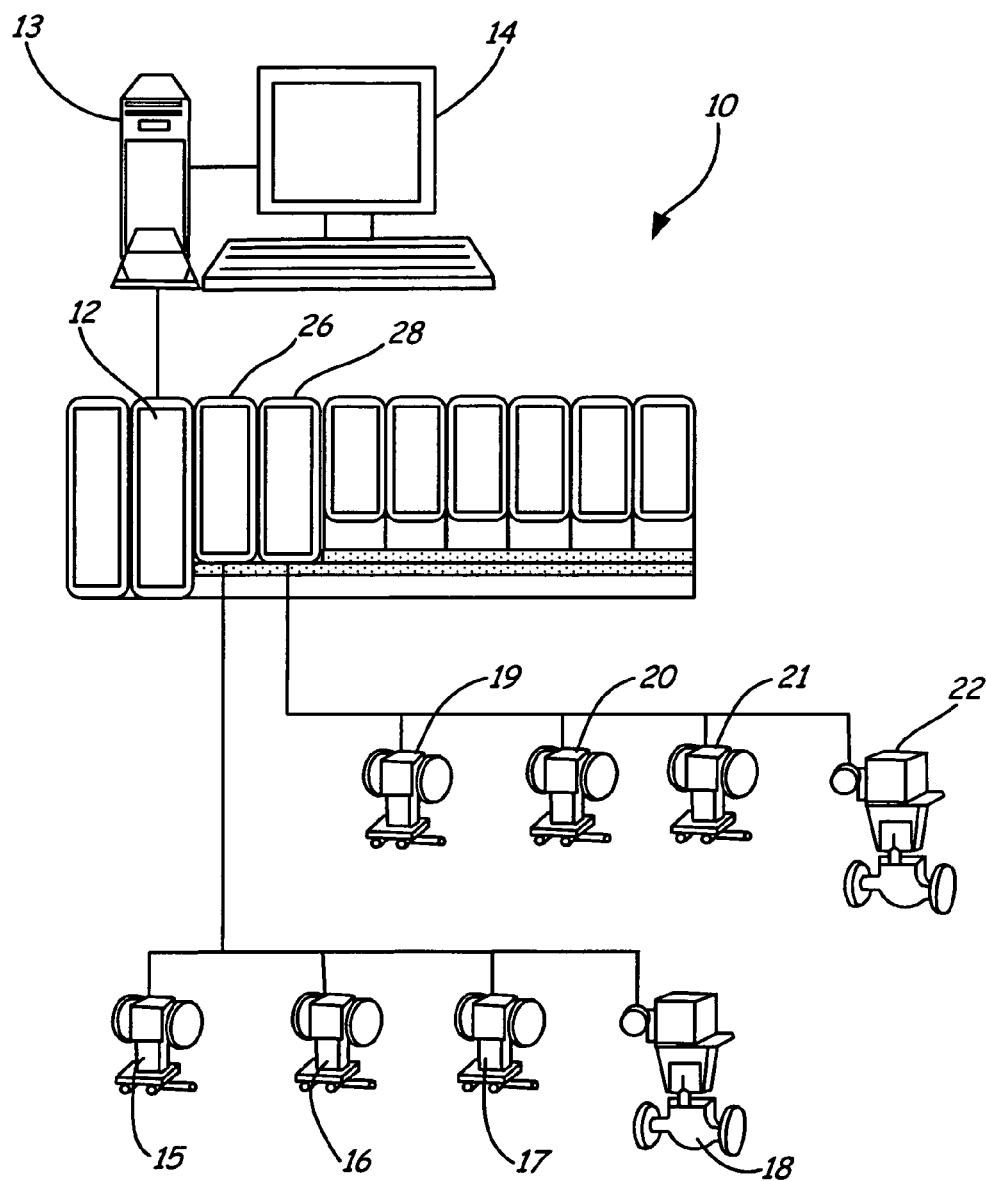
FIG. 1 is a block diagram of a process control system with which embodiments of the present invention can be used.

Referring now to FIG. 1, process control system 10 includes process controller 12 connected to host work-station or computer 13 (which may be any type of personal computer or workstation) having a display screen 14 and connected to field devices 15-22 via input/output (I/O) cards 26 and 28. The controller 12, which may be by way of example, the DeltaV™ controller sold by Fisher-Rosemount Systems, Inc., is communicatively connected to host computer 13 via, for example, an ethernet connection and is communicatively connected to the field devices 15-22 using any desired hardware and software associated with the Fieldbus protocol. The controller 12 implements or oversees a process control routine stored therein or otherwise associated therewith and communicates with the devices 15-22 and the host computer 13 to control a process in any desired manner.

The field devices 15-22 may be any types of devices, such as sensors, valves, transmitters, positioners, et cetera while the I/O cards 26 and 28 may be any types of I/O devices conforming to the Fieldbus protocol. In the embodiment illustrated in FIG. 1, the field devices 15-22 are smart devices, such as Fieldbus field devices, that communicate over a digital bus to the I/O card 28 using Fieldbus protocol communications. Generally speaking, the Fieldbus protocol is an all-digital, serial, two-way communication protocol that provides a standardized physical interface to a two-wire loop or bus that interconnects filed devices. The Fieldbus protocol provides, in effect, a local area network for field devices within a process, which enables these field devices to perform process control functions (using function blocks) at locations distributed throughout a process facility and to communicate with one another before and after the performance of these process control functions to implement an overall control strategy. It will be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex. As a result, most details of the Fieldbus communication protocol will not be described in detail herein.

Controller 12 is configured to implement a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, et cetera control, or an output function which controls the operation of some device, such as a valve, to perform some physical function within the process control system 10. Of course hybrid and other types of function blocks exist. Function blocks may be stored in and executed by the controller 12, which is typically the case when these function blocks are used for, or are associated with standard 4-20 ma devices and some types of smart field devices, or may be stored in and implemented by the field devices themselves, which is the case with Fieldbus devices. While the description of the control system is provided herein using function block control strategy, the control strategy could also be implemented or designed using other conventions, such as ladder logic.

The wealth of new capabilities of smart field devices is placing an increasing strain on the ability of the 31.25 kbps data communication capacity of H1 Fieldbus networks to transmit the required volume of information. A review of the H1 Fieldbus network has revealed that the maximum transmission rate is generally constrained by two factors: data transmission energy; and the allowed bit-error rate. While the data transmission energy is generally limited by specification of the H1 Fieldbus protocol, as well as design constraints that ensure that the field devices and/or network can comply with intrinsic safety requirements, the bit error rate is not so limited. To comply with intrinsic safety requirement, a field device must comply with the intrinsic safety requirements set forth in: APPROVAL STANDARD INTRINSICALLY SAFE APPARATUS AND ASSOCIATED APPARATUS FOR USE IN CLASS I, II AND III, DIVISION 1 HAZARDOUS (CLASSIFIED) LOCATIONS, CLASS NUMBER 3610, promulgated by Factory Mutual Research October, 1988.

Currently, H1 Fieldbus networks employ a 16-bit CRC error-checking regime. This regime, employs a 17-bit key that is repeatedly divided into blocks of message data bits to arrive at essentially a remainder. Since this transformation is known to both the sender and receiver of the data bits, the 16 bit remainder is appended to the message data. Thus, the sender executes the operation of dividing the 17-bit key into the block of message data, and appends the resultant 16-bit remainder to the transmitted data. The receiver then performs the same operation upon the received message block and compares its result with the received 16 bit "checksum" code. If they match, the receiver determines that the message has been received successfully. Variations upon the types and/or nature of the mathematical or Boolean operations exist within the field of cyclic redundancy check-based error checking. However, such methods generally require the addition of the "checksum" to the message data. One limitation of this approach is evident when the decoded checksum and the received checksum do not match. In that case, the receiver must indicate to the sender that the communication was not successful, and the sender must then re-transmit the data. This adds significant overhead to the communication, but helps ensure that valid data is received. Another known limitation of CRC based error checking is that there is a $1/(2^{n-1})$ chance that the remainder will match, thereby indicating, falsely, that the transmission was successful. The chance of this error occurring is generally mitigated successfully by using a suitable large number of bits (n) for the key. In the case of a 16 bit CRC, that chance is $1/65,536$.

Figure 2:
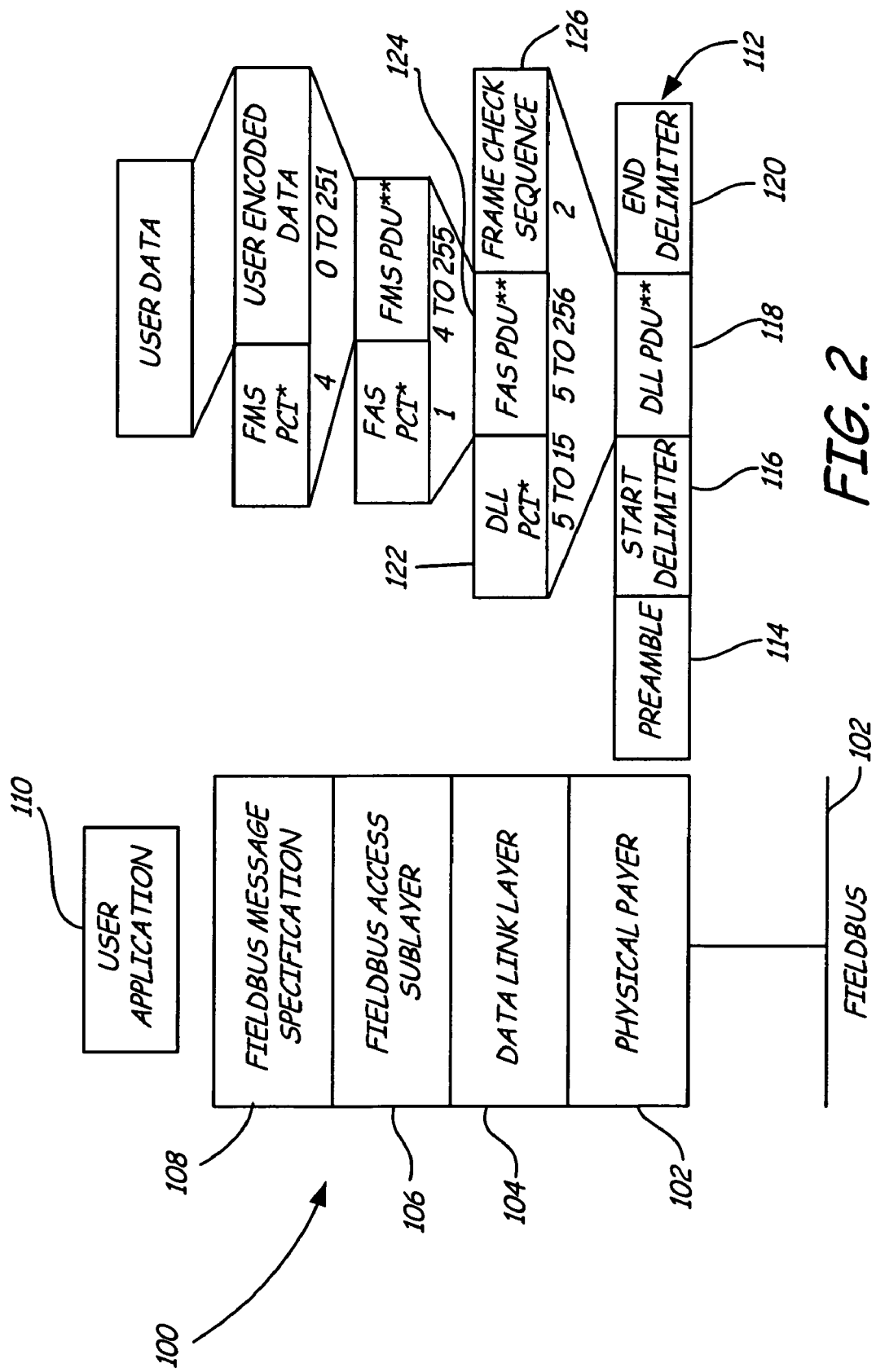
FIG. 2 is a diagrammatic view of Fieldbus data 100 on H1 Fieldbus network 102.

FIG. 2 is a diagrammatic view of Fieldbus data 100 on H1 Fieldbus network 102. The Fieldbus data 100 can generally be classified into one of five layers. Specifically, Fieldbus data 100 has a physical layer 102, a data link layer 104, a Fieldbus access sub layer 106, a Fieldbus message specification 108 and user application data 110. The physical layer 102 is generally adapted for compliance with the known OSI (open systems interconnect) model layer 1. A given physical layer communication 112 generally includes preamble 114, start delimiter 116, data link layer protocol data unit 118 and end delimiter 120. The data within block 118 is generally that used for data link layer 104. In particular, data link layer protocol data unit 118 includes data link layer protocol control information 122 that may have a length between 5 and 15 eight-bit "octets." Further, protocol data unit 118 also includes Fieldbus access sub-layer protocol data unit 124 that has a length ranging between 5 and 256 eight-bit octets. Finally, data link layer protocol data unit 118 includes frame check sequence 126 that is comprised of two eight-bit octets. It is these two octets that are used for the 16 bit cyclic redundancy check-based error detection that has been done in the past.

Advanced error correction techniques such as turbo codes and low-density parity-check (LDPC) codes are known. Such codes are believed to allow for information capacity upon a given noisy channel at rates approaching that of Shannon's limit. Claude Shannon provided a theorem that gives the theoretical maximum rate of clean data with a given average signal power that can be sent through an analog communication channel subject to additive white noise as:

C=bandwidth×log$_2$ (1+(total signal power/total noise power)) where C=the channel capacity in bits per second.

Low-density parity-check codes (LDPC) were first introduced in the early 1960's. However, they were impractical to implement at that time. For the following 30 years, they remained essentially the most effective error correcting code developed. Such codes are known in the use of satellite transmission of digital television. One type of LDPC employs sparse matrices that are generated subject to sparsity constraints. A given message is encoded by placing bits in such a way that they comply with the sparsity constraints. There are various known ways of constructing LDPC codes including: Gallager codes; MacKay codes; irregular LDPC codes; finite geometry codes; RA, IRA, and eRIA codes; array codes; and combinatorial LDPC codes. Essentially, the coding of an LDPC code is generated by applying a particular structure, or form of a priori knowledge, to the arrangement of the individual bits. For example, a given set of constraints may require that only eight possible six-bit strings correspond to valid code words (i.e. 000000, 011001, 110010, 111100, 101011, 100101, 001110, and 01011). Thus, an LDPC code fragment may represent a three-bit message with six bits. If a given message arrives with a particular bit erased or unknown, the structure of the allowed code words can be consulted, to determine or otherwise disambiguate the corrupted bit. For further information regarding LDPC codes, see low-density parity-check code, http://en.wikipedia.org/w/index.php?title=Low-density partiy-check code&oldid=51980699. Additionally, see *Information Theory, Inference and Learning Algorithms*, by David J. C. MacKay, ISBN 0521642981.

Turbo codes are similar to LDPC codes in that they allow significantly increased data communication capacity approaching that of Shannon's limit. However, the mechanics of turbo codes are significantly different than LDPC codes. One important difference with turbo codes is in the way that binary digits are decoded. Instead of simply attempting to decode a 1 or a 0, the front end of the decoder is designed to produce a likelihood measure for each bit. For example, the decoder front end can produce an integer value ranging between −127 and +127; where −127 represents a certain 0, and +127 represents a certain 1. Values between −127 and +127 represent the continuum of probabilities that the decoded bit is either a 1 or a 0, with an integer 0 representing that the bit has equal probabilities of being either a 0 or a 1. Another aspect of turbo codes is that at least three sub-blocks of bits are sent. The first sub-block of bits is an M-bit block of payload data. The second sub-block is N/2 parity bits for the payload data, computed using a suitable convolutional code. A third sub-block of parity bits is provided using a different known permutation of the payload data but also computed using a convolutional code.

Essentially, two redundant but different blocks of parity bits are sent for a given M-bit block of payload data. The decoder of the turbo codes must include a decoder module for each block of the parity bits. Each convolutional decoder generates a proposed output for the pattern of M-bits of the payload sub-block. If the proposed outputs are different, the convolutional decoders can exchange the derived likelihoods stored for each bit in the proposed output. Then, each decoder can incorporate likelihood estimates from the other decoder to generate a new proposed output until the two convolutional decoders agree on the proposed output on the M-bit sub-block.

Decoding of the transmitted data using LDPC codes or turbo codes generally requires an iterative decoding process. Moreover, the computational complexity, coupled with the iteration generates computational intensity that is higher than what was previously required for 16-bit cyclic redundancy checks. However, use of error correction techniques provides important advantages over the cyclic redundancy checking approaches of the past. Specifically, if the 16-bit cyclic redundancy check of the H1 Fieldbus protocol does not register a match between the decoded checksum and the transmitted checksum, the field device is required to indicate that the data sent to the field device over the H1 Fieldbus network was corrupted. Then, the data must be resent to the Fieldbus device. However, the use of LDPC codes and turbo codes not only allow for errors in the transmission to be identified, but individual bit values can actually be corrected based upon the algorithms. Thus, the communication overhead required by making the field device contact the source of information and indicate that the information received by the field device was corrupt; request that the information be transmitted again; and finally to receive the re-transmitted information is removed. This provision of not only error detection, but actual error correction in H1 Fieldbus network is believed to allow for the network to run at a substantially increased data communication speed. Additionally, or alternatively, it is believed that employing error detection and correction in accordance with embodiments of the present invention can allow the transmission energy used over the H1 Fieldbus network to be reduced. The reduction of transmission energy is important in that it may allow operation of an increased number of field devices in intrinsically safe segments. To date, the number of devices possible on a given H1 Fieldbus segments depends on such factors as power consumption of each device, the type of cable of use, use of repeaters, etc. Generally, the number of devices is limited to 32 devices. However, the number of network addresses available for each segment is 240.

Figure 3:
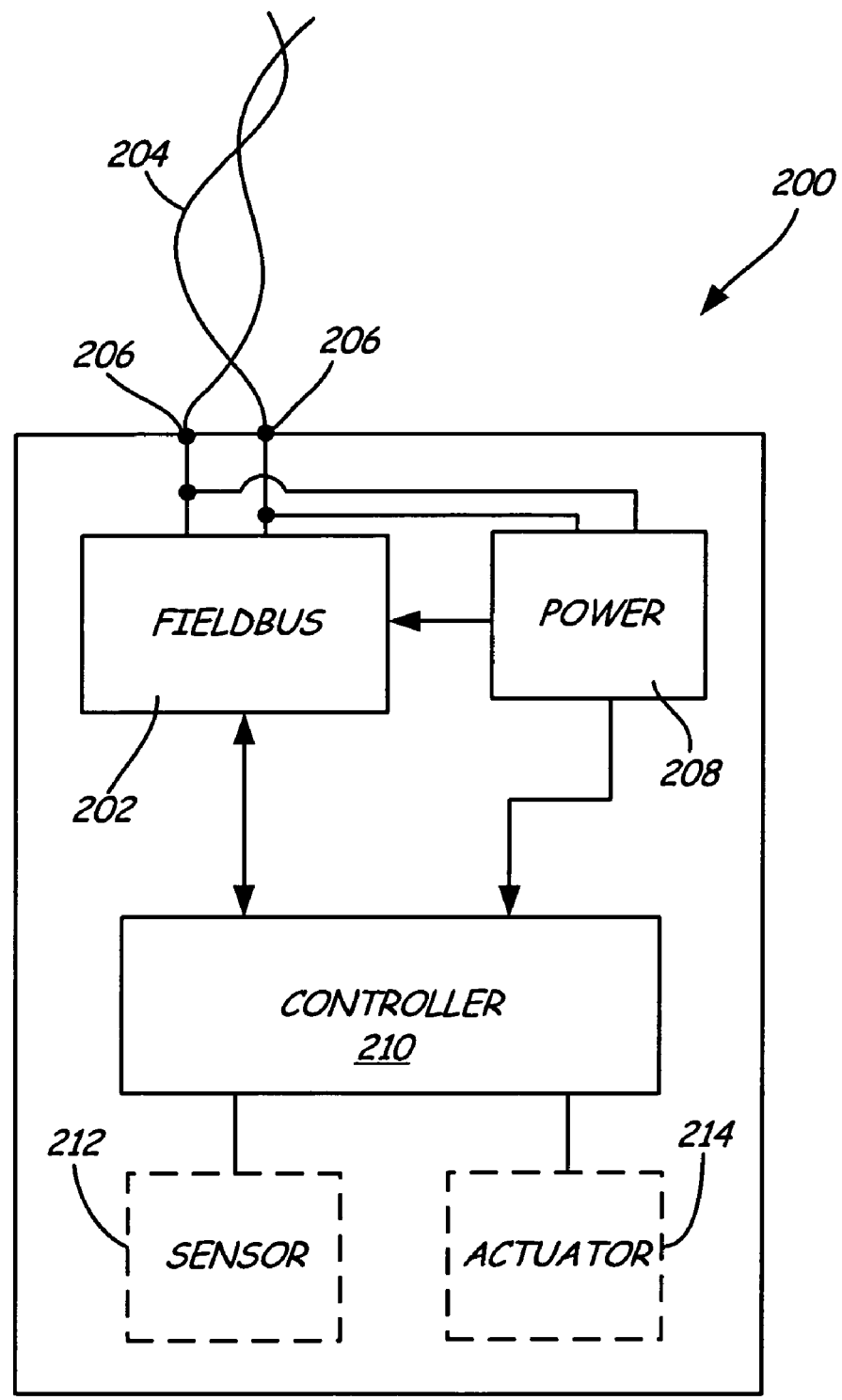
FIG. 3 is a diagrammatic view of a field device in accordance with an embodiment of the present invention.

FIG. 3 is a diagrammatic view of a field device in accordance with an embodiment of the present invention. Field device 200 includes Fieldbus communication module 202 coupled to H1 Fieldbus process communication loop 204 via terminals 206. Field device 200 includes power module 208 that is operably coupled to H1 Fieldbus process communication loop 204. Power module 208 is configured to condition, or otherwise adapt, power received over loop 204 to various other modules within field device 200 in order to allow field device 200 to be wholly powered by energy received from H1 Fieldbus loop 204. Field device 200 also includes controller 210 operably coupled to power module 208 and Fieldbus communications module 202. Controller 210 is preferably a low-power microprocessor. Field device 200 optionally includes a process variable sensor 212 and/or process actuator 214.

In accordance with an embodiment of the present invention, Fieldbus communications module 202 is configured to provide error detection and correction such as that described above. Fieldbus communications module 202 employs an iterative decoding algorithm to decode Fieldbus communications that are sent using LDPC codes or turbo codes. Preferably, field device 200 registers its ability to communicate using error detection and correction techniques. One way in which field devices can surface their capabilities in the process communication environment is using the known Device Description language. Finally, referring back to FIG. 2, it is noted that frame check sequence 126 in data link layer 104 consists merely of two octets of data. However, use of LDPC codes and/or turbo codes generally requires a significantly higher proportion of parity check information in comparison to the payload data. Thus, in accordance with embodiments of the present invention, the error checking and correcting codes may occupy a larger portion than the data link layer than can fit in the frame check sequence portion 126. Accordingly, it is contemplated that Fieldbus access sub-layer protocol data unit 124 not only includes the data payload, but some or all of the parity check information. In this way, Fieldbus error correction can be accomplished in a manner that is transparent to the user application 110. This is important in that implementation of embodiments of the present invention may not require rewriting of any user applications, which is believed to facilitate implementation.

Although the present invention has been described with reference to preferred embodiments, workers skilled in the art will recognize that changes may be made in form and detail without departing from the spirit and scope of the invention.

What is claimed is:

1. A field device comprising:
   a Fieldbus communications module operably coupled to an H1 Fieldbus communications network;
   a controller coupled to the Fieldbus communications module; and
   wherein the Fieldbus communications module is configured to provide error correction to data received from the H1 Fieldbus communications network.

2. The field device of claim 1, wherein the Fieldbus communications module is configured to iteratively decode information received from the Fieldbus communications network.

3. The field device of claim 2, wherein the Fieldbus communications module is configured to iteratively decode LDPC codes received through the H1 Fieldbus communications network.

4. The field device of claim 2, wherein the Fieldbus communications module is configured to decode turbo codes received through the H1 Fieldbus communications network.

5. The field device of claim 1, and further comprising a power module operably coupled to the H1 Fieldbus communications network, wherein the power module is coupled to the Fieldbus communications module and the controller, and wherein the power module is configured to wholly power the field device with energy received from the H1 Fieldbus communications network.

6. The field device of claim 5, wherein the field device is intrinsically safe.

7. The field device of claim 1, wherein the field device is intrinsically safe.

8. The field device of claim 1, wherein the field device includes a sensor configured to sense a process variable and provide an indication thereof to the controller.

9. The field device of claim 1, wherein the field device includes an actuator operably coupled to controller, and wherein the actuator is configured to modify a process based upon a signal received from the controller.

10. A method of modifying a message received over an H1 Fieldbus data communication network, the method comprising:
    receiving a block of data bits over the H1 Fieldbus network;
    receiving a plurality of blocks of parity bits;
    processing the blocks of parity bits to generate an hypothesis related to the block of data bits; and
    changing at least one bit of the block of data bits based upon the hypothesis.

11. A method of modifying a message received over an H1 Fieldbus communications network, the method comprising:
    receiving a plurality of data bits;
    detecting that at least one of the received data bits is corrupted; and
    applying a priori knowledge of allowed code words for the data bits to correct the corrupted bit.

* * * * *